(12) United States Patent
Lemke

(10) Patent No.: US 7,124,300 B1
(45) Date of Patent: Oct. 17, 2006

(54) HANDHELD COMPUTER SYSTEM CONFIGURED TO AUTHENTICATE A USER AND POWER-UP IN RESPONSE TO A SINGLE ACTION BY THE USER

(75) Inventor: Steve Lemke, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 858 days.

(21) Appl. No.: 09/769,654

(22) Filed: Jan. 24, 2001

(51) Int. Cl.
H04K 1/00 (2006.01)
G05B 19/00 (2006.01)
G06F 7/04 (2006.01)

(52) U.S. Cl. .................. 713/186; 713/182; 713/184; 340/5.53; 726/5

(58) Field of Classification Search ............. 713/182, 713/185, 186, 184; 709/227; 340/726, 5.53, 340/5
See application file for complete search history.

(56) References Cited

U.S. PATENT DOCUMENTS

| 5,900,875 | A | * | 5/1999 | Haitani et al. | 345/840 |
| 6,016,476 | A | * | 1/2000 | Maes et al. | 713/186 |
| 6,434,403 | B1 | * | 8/2002 | Ausems et al. | 455/556.2 |
| 2002/0089410 | A1 | * | 7/2002 | Janiak et al. | 340/5.53 |

* cited by examiner

Primary Examiner—Kambiz Zand
Assistant Examiner—Courtney D. Fields

(57) ABSTRACT

A computer system configured to authenticate a user and to power-up in response to a single action by the user is described. In particular, the computer system includes a user verification device which interacts with the user. In an embodiment, the user verification device includes a biometric sensor which captures biometric data from the user. The biometric data can be of any type. The user verification device is configured to capture biometric data in response to an action by the user desiring access to the computer system. The user verification device can have a button-shape for receiving the finger, thumb, or any other part of the user.

21 Claims, 10 Drawing Sheets

HANDHELD COMPUTER SYSTEM CONFIGURED TO AUTHENTICATE A USER AND POWER-UP IN RESPONSE TO A SINGLE ACTION BY THE USER

BACKGROUND OF THE INVENTION

1. Field of the Invention

The present invention generally relates to the field of computer systems. More particularly, the present invention relates to the field of activation and authentication procedures invoked by a user desiring access to a computer system configured to allow access to an authorized user.

2. Related Art

Computers and other electronic systems or devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic system or device is dramatically enhanced by coupling these stand-alone devices together in order to form a networking environment. Within a networking environment, users may readily exchange files, share information stored on a common database, pool resources, and communicate via electronic mail (e-mail) and via video teleconferencing. Furthermore, computers or other types of electronic devices which are coupled to the Internet provide their users access to data and information from all over the world.

The functionality of an electronic system (e.g., a palmtop computer system, a desktop computer system, a cellular phone, a pager, etc.) is enhanced by including an electronic display device. On occasion, the electronic system includes one or more communication ports for exchanging or sharing data with other electronic systems or with a network. For example, an infrared (IR) communication port, a radio communication port, or other type of communication port can be incorporated into the electronic system. A communication port is positioned in the electronic system according to a variety of factors, such as space requirements, industry standards, and convenience to a user.

A personal digital assistant (commonly referred to as a PDA) is a palmtop computer system. It is appreciated that the personal digital assistant is a portable handheld device that is used as an electronic organizer which has the capability to store a wide range of information that includes daily appointments, numerous telephone numbers of business and personal acquaintances, and various other information. Moreover, the personal digital assistant can also access information from the Internet, as mentioned above. In particular, the personal digital assistant can browse Web pages located on the Internet. Typically, the personal digital assistant includes an electronic display device having a display area (e.g., a screen) that is smaller in size relative to a display area associated with a standard-sized electronic display device (e.g., 15 inch monitor, 17 inch monitor, etc.) which is part of a desktop computer system or a laptop computer system.

Typically, the personal digital assistant includes a communication port (e.g., an IR communication port, a radio communication port, a serial communication port for coupling to a communication cable, etc.). For example, a IR communication port is positioned along the top edge of the personal digital assistant so that a user can conveniently view and read the electronic display device and at the same time communicate with another electronic system located across from the user while the user holds the personal digital assistant.

Moreover, the personal digital assistant can be configured to allow access only to an authorized user so that to protect the stored data of the personal digital assistant and to discourage theft of the personal digital assistant. Typically, a user desiring to access the personal digital assistant begins by first turning on the personal digital assistant. Generally, the user presses a power button. After powering-up, the personal digital assistant executes a security software which prompts the user for particular data, whereas the personal digital assistant denies the user the capability to operate its functions and to access the stored data until the user has successfully completed a security procedure to verify the identity of the user. Examples of the particular data include a personal identification number (PIN), a password, and stroking particular characters on the handwriting recognition pad (or digitizer) with a stylus. Thereafter, the user furnishes the particular data to the personal digital assistant. Then, the personal digital assistant verifies the particular data. If the verification process is successful, the personal digital assistant grants access to the user desiring to use the personal digital assistant.

Unfortunately, the security functionality of the personal digital assistant is typically disabled by the user and not used because of several reasons. Some users perceive the security procedure as inconvenient, interfering with the primary function of the personal digital assistant: providing quick access to frequently used data. Other users mistakenly feel that this security functionality does not improve their experience with the personal digital assistant. Moreover, still other users are unconvinced that this security functionality is sufficiently secure to protect the stored data.

SUMMARY OF THE INVENTION

A computer system configured to authenticate a user and to power-up in response to a single action by the user is described. In particular, the computer system includes a user verification device which interacts with the user. In an embodiment, the user verification device includes a biometric sensor which captures biometric data from the user. The biometric data can be of any type. Examples of the biometric data include a thumbprint, a fingerprint, a magnetic characteristic, a color characteristic, a temperature characteristic, a geometric characteristic, and a combination thereof of the user. The user verification device is configured to capture biometric data in response to an action by the user desiring access to the computer system. For example, the user can activate the user verification device by pressing, swiping, touching, or interacting with the user verification device in any other manner. The user verification device can have a button-shape for receiving the finger, thumb, or any other part of the user.

With this single action by the user upon the user verification device, the user alerts the computer system that the user desires to access the computer system and enables the user verification device to capture the biometric data. Then, the computer system verifies the biometric data. If the verification is successful, the computer system powers-up to a normal operation mode and allows the user to use the computer system. Upon powering-up, the computer system can automatically launch an application program. In sum, the present invention provides a security procedure for accessing a computer system which is convenient while still enabling the user to quickly access frequently used data. Moreover, the security procedure is secure and improves the user's experience with the computer system.

In one embodiment, the present invention includes a method of enabling a user to access a computer system and activating the computer system, comprising the steps of: a) capturing biometric data from the user desiring access to the computer system having a user verification device in response to initial interaction by the user with the user verification device; b) verifying identity of the user using the biometric data; and c) if verification in the step b) is successful, powering-up the computer system to a normal operation mode and granting the user access to the computer system.

In another embodiment, the present invention includes a computer system comprising: a user verification device for capturing biometric data from a user, wherein the user initially interacts with the user verification device to gain access to the computer system; a memory device for storing a reference template representing stored biometric data from an authorized user; and a processor coupled to the user verification device and to the memory device, the processor operative to receive the biometric data and to compare the biometric data with the reference template, wherein if a match is determined, the computer system is powered-up from an inactive mode to a normal operation mode and the user is granted access to the computer system.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Although the description of the present invention will focus on a personal digital assistant or handheld computer system, the present invention can be practiced with other types of computer systems.

Computer System Environment

One of the common types of computer systems which can be used to practice the present invention is referred to as a personal digital assistant, or commonly called a PDA. The personal digital assistant is a pocket sized electronic organizer with the capability to store telephone numbers, addresses, daily appointments, and software that keeps track of business or personal data such as expenses, etc. Furthermore, the personal digital assistant also has the ability to connect to a personal computer, enabling the two devices to exchange updated information. Additionally, the personal digital assistant can also be connected to a modem, enabling it to have electronic mail (e-mail) capabilities over the Internet along with other Internet capabilities. Moreover, an advanced personal digital assistant can have Internet capabilities over a wireless communication interface (e.g., radio interface). In particular, the personal digital assistant can be used to browse Web pages located on the Internet. The personal digital assistant can be coupled to a networking environment. It should be appreciated that embodiments of the present invention are well suited to operate within a wide variety of computer systems, some of which can be communicatively coupled to a networking environment.

Figure 1:
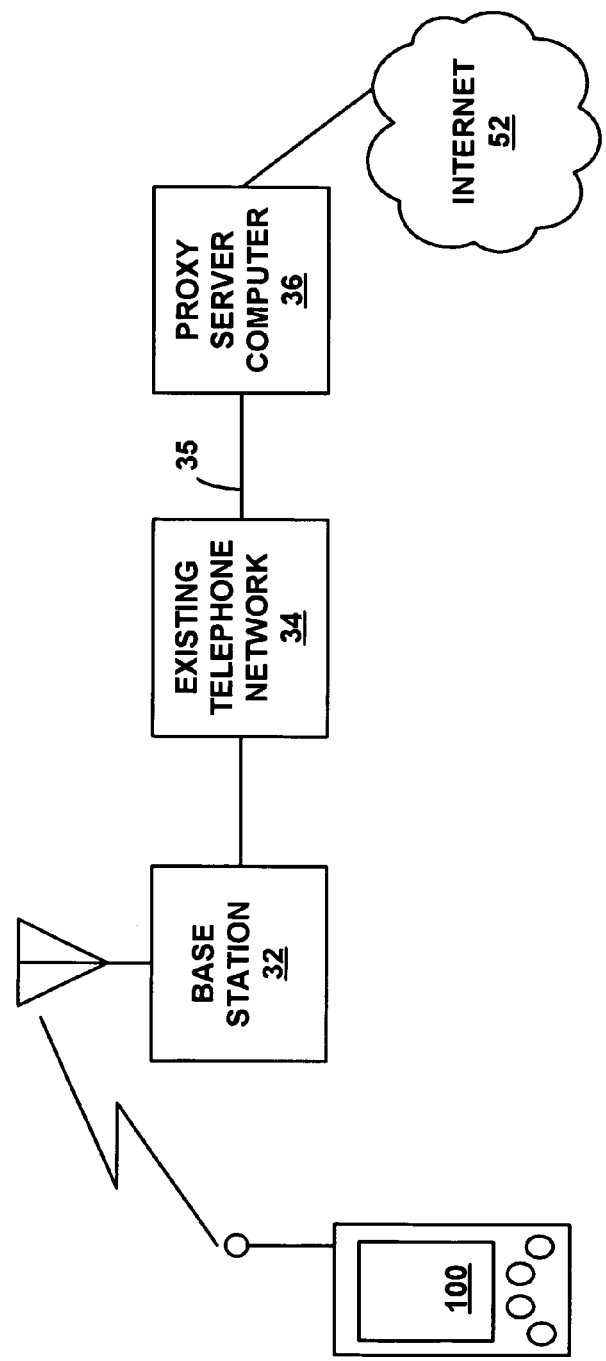
FIG. 1 illustrates a block diagram of a first exemplary network environment including a personal digital assistant on which the present invention can be practiced.

FIG. 1 is a block diagram of a first exemplary network environment 50 including a personal digital assistant 100 on which the present invention can be practiced. The personal digital assistant 100 is also known as a palmtop or palm-sized electronic system or computer system. Here, the personal digital assistant 100 has the ability to transmit and receive data and information over a wireless communication interface (e.g., a radio interface). The personal digital assistant 100 is one exemplary computer system on which the present invention can operate. The present invention can operate on any other type of computer system.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the personal digital assistant 100 to communicate with the Internet 52. It should be appreciated that within the present embodiment, one of the functions of proxy server 36 is to perform operations over the Internet 52 on behalf of the personal digital assistant 100. For example, proxy server 36 has a particular Internet address and acts as a proxy device for the personal digital assistant 100 over the Internet 52. It should be further appreciated that other communications networks may be utilized in practicing the present invention.

The data and information which are communicated between base station 32 and the personal digital assistant 100 are a type of information and data that can conventionally be transferred and received over a public telephone wire network system. However, a wireless communication interface is utilized to communicate data and information between the personal digital assistant 100 and base station 32. It should be appreciated that one embodiment of a wireless communication system in accordance with the present invention is the Mobitex wireless communication system.

Figure 2:
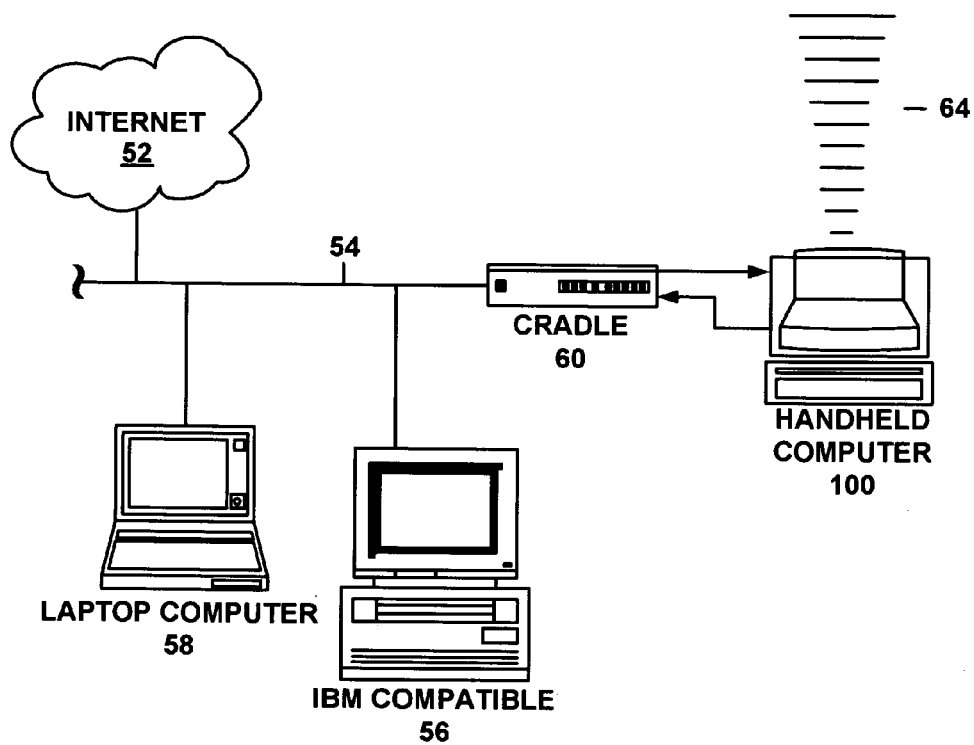
FIG. 2 illustrates a block diagram of a second exemplary network environment including a personal digital assistant on which the present invention can be practiced, whereas the personal digital assistant is coupled to other computer systems and the Internet via a cradle device.

FIG. 2 illustrates a block diagram of a second exemplary network environment 51 including a personal digital assistant 100 on which the present invention can be practiced, whereas the personal digital assistant 100 is coupled to other computer systems and the Internet via a cradle device. Network system 51 comprises a host computer system 56 which can either be a desktop computer system as shown, or, alternatively, can be a laptop computer system 58. Optionally, more than one host computer system 56 can be used within network system 51. Host computer systems 58 and 56 are shown connected to a communication bus 54, which in one embodiment can be a serial communication bus, but could be of any of a number of well known designs (e.g., a parallel bus, Ethernet Local Area Network (LAN), etc.). Optionally, bus 54 can provide communication with the Internet 52 using a number of well known protocols.

Importantly, bus 54 is also coupled to a cradle 60 for receiving and initiating communication with the personal digital assistant 100. Cradle 60 provides an electrical and mechanical communication interface between bus 54 (and any device coupled to bus 54) and the personal digital assistant 100 for two-way communications. The personal digital assistant 100 also contains a wireless infrared communication mechanism 64 for sending and receiving information from other devices.

With reference to both FIGS. 1 and 2, it is appreciated that the personal digital assistant 100 can be used in a network environment combining elements of networks 50 and 51. That is, as will be seen below, the personal digital assistant 100 can include both a wireless infrared communication mechanism and a signal (e.g., radio) receiver/transmitter device.

Figure 3:
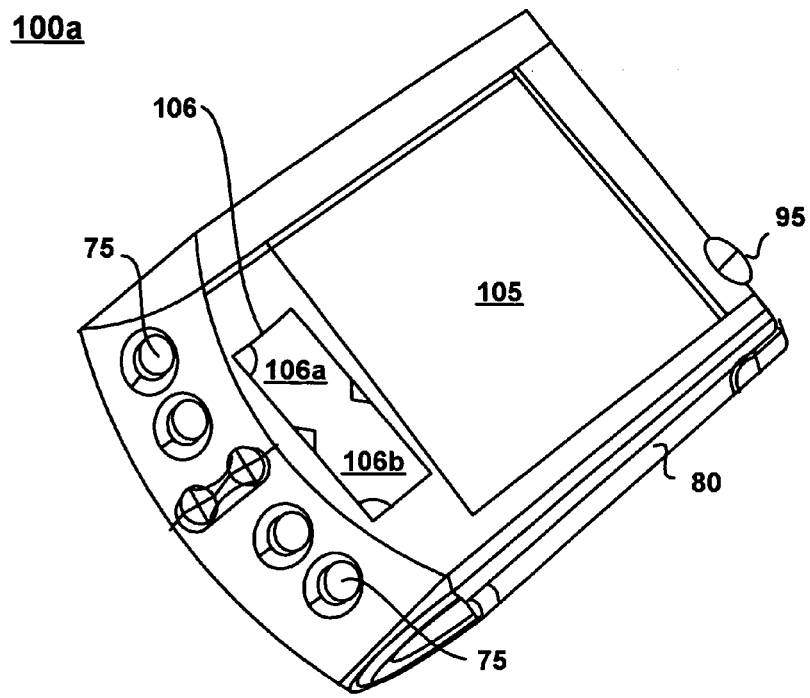
FIG. 3 illustrates a top side perspective view of a personal digital assistant on which the present invention can be practiced.

FIG. 3 is a perspective illustration of the top face 100a of one embodiment of the personal digital assistant or palmtop computer system 100. The top face 100a has a display screen 105 surrounded by a bezel or cover. A removable stylus 80 is also shown. The display screen 105 is a touch screen able to register contact between the screen and the tip of the stylus 80. The stylus 80 can be of any material to make contact with the display screen 105. The top face 100a also has one or more dedicated and/or programmable buttons 75 for selecting information and causing the computer system to implement functions. The on/off button 95 is also shown. Moreover, a user is able to control specific functionality of the personal digital assistant 100 by using its plurality of buttons 75 (e.g., to invoke telephone/address data, calendar data, to-do-list data, memo pad data, etc.). Furthermore, the user can utilize the stylus 80 in conjunction with the display screen 105 in order to cause the personal digital assistant 100 to perform a multitude of different functions. One such function is the selecting of different functional operations of the personal digital assistant 100, which are accomplished by touching stylus 80 to specific areas of display screen 105. Another such function is the entering of data into the exemplary personal digital assistant 100.

FIG. 3 also illustrates a handwriting recognition pad 106 or "digitizer" containing two regions 106a and 106b. Region 106a is for the drawing of alphabetic characters therein for automatic recognition, and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 4:
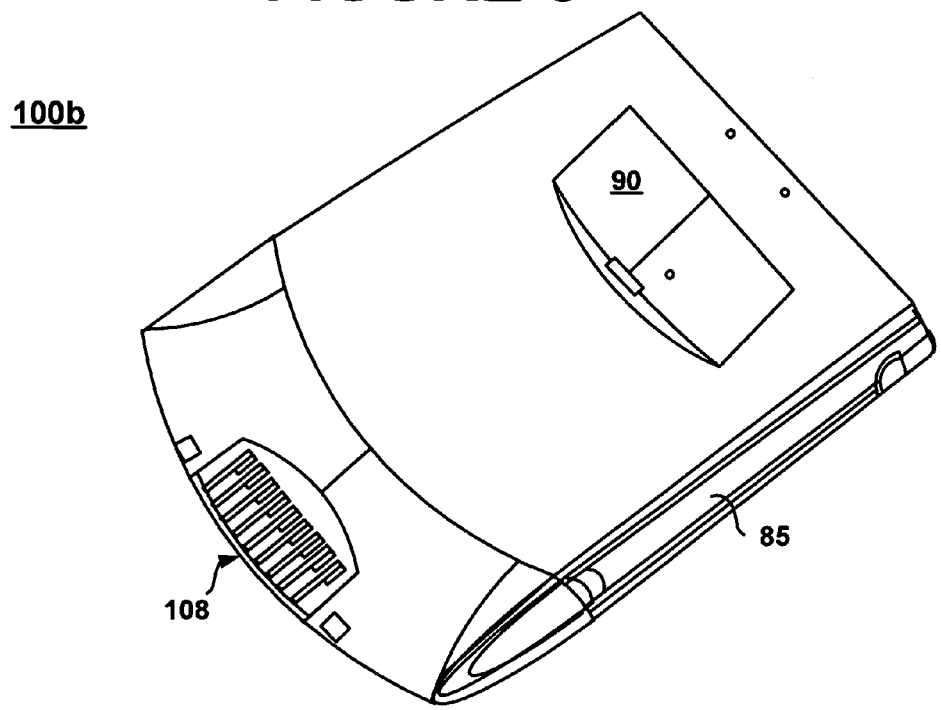
FIG. 4 illustrates a bottom side perspective view of the personal digital assistant of FIG. 3.

FIG. 4 illustrates the bottom side 100b of one embodiment of the personal digital assistant or palmtop computer system 100 that can be used in accordance with various embodiments of the present invention. An extendible antenna 85 is shown, and also a battery storage compartment door 90 is shown. The antenna 85 enables the personal digital assistant 100 to be communicatively coupled to a network environment (as shown in FIG. 1) thereby enabling a user to communicate information with other electronic systems and electronic devices coupled to the network. A communication interface 180 is also shown. In one embodiment of the present invention, the communication interface 180 is a serial communication port, but could also alternatively be of any of a number of well-known communication standards and protocols (e.g., parallel, SCSI (small computer system interface), Firewire (IEEE 1394), Ethernet, etc.).

Figure 5:
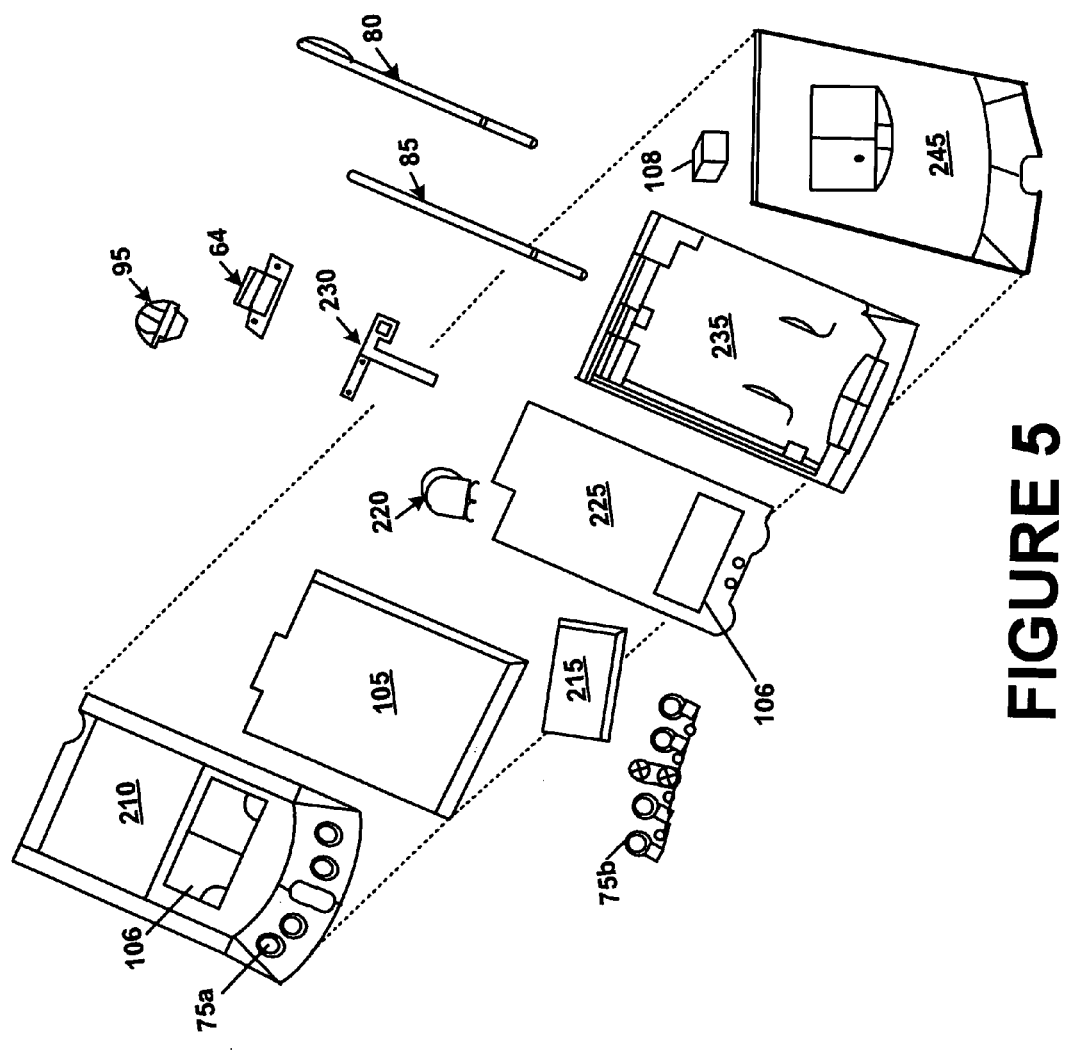
FIG. 5 illustrates an exploded view of the components of the personal digital assistant of FIG. 3.

FIG. 5 is an exploded view of the personal digital assistant 100. The personal digital assistant 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a personal computer (PC) board 225 containing electronics and logic (e.g., memory, communication bus, processor, etc.) for implementing computer system functionality. The digitizer pad 106 is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 2). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between the personal digital assistant 100 and other networked computers and/or the Internet via a proxy server (see FIG. 1).

Figure 6:
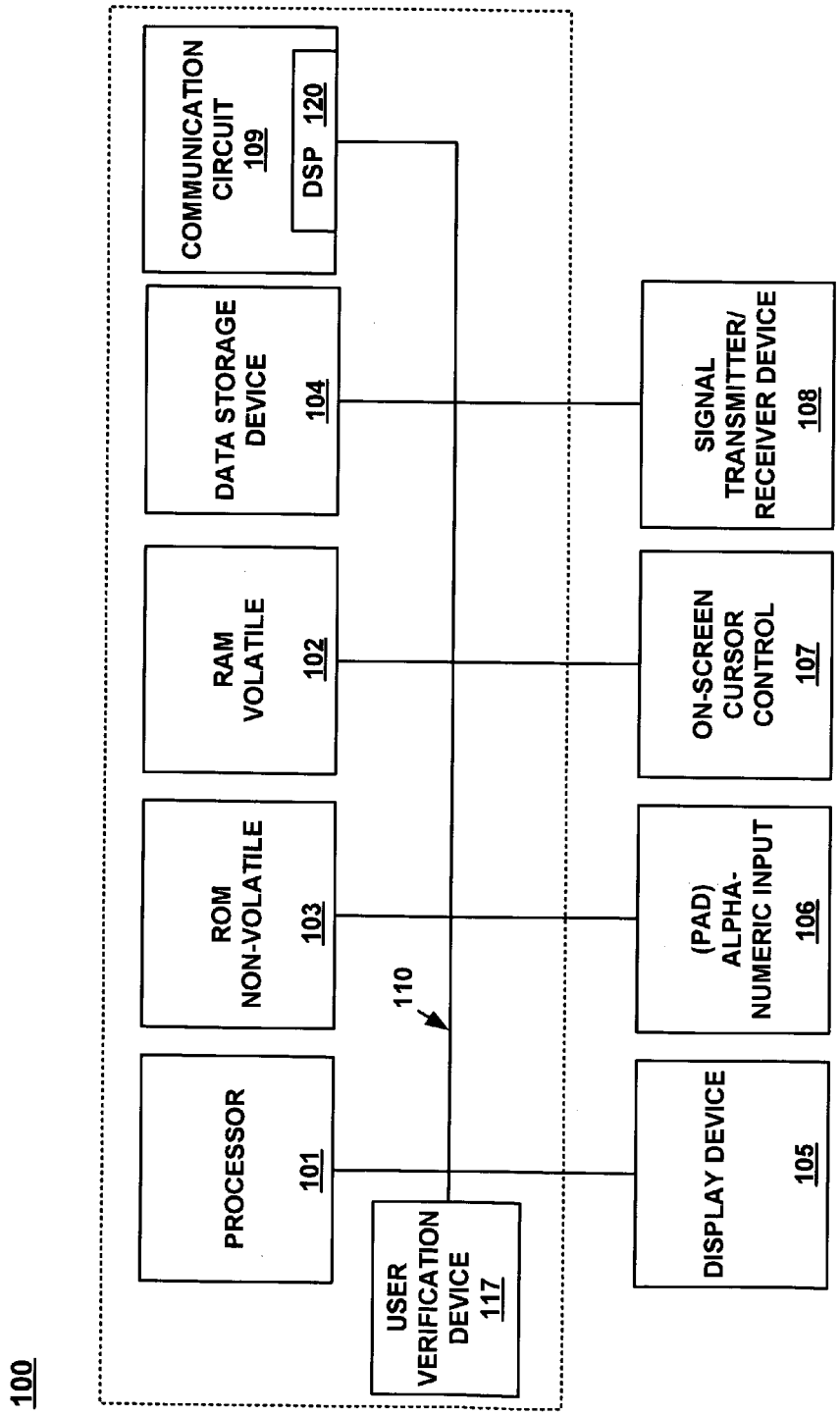
FIG. 6 illustrates is a logical circuit block diagram of a personal digital assistant in accordance with an embodiment of the present invention.

Referring now to FIG. 6, portions of the personal digital assistant 100 are comprised of computer-readable and computer-executable instructions which reside, for example, in computer-readable media of the personal digital assistant 100.

FIG. 6 is a block diagram of interior components of a personal digital assistant 100 in accordance with an embodiment of the present invention. The personal digital assistant 100 includes an address/data bus 110 for communicating information, a central processor 101 coupled to the bus 110 for processing information and instructions, a volatile memory 102 (e.g., random access memory, static RAM, dynamic RAM, etc.) coupled to the bus 110 for storing information and instructions for the central processor 101 and a non-volatile memory 103 (e.g., read only memory, programmable ROM, flash memory, EPROM, EEPROM, etc.) coupled to the bus 110 for storing static information and instructions for the processor 101. The personal digital assistant 100 also includes an optional data storage device 104 (e.g., memory card, hard drive, etc.) coupled with the bus 110 for storing information and instructions. Data storage device 104 can be removable. As described above, the personal digital assistant 100 also includes an electronic display device 105 coupled to the bus 110 for displaying information to the computer user. In one embodiment, PC board 225 can include the processor 101, the bus 110, the ROM 103 and the RAM 102.

With reference still to FIG. 6, the personal digital assistant 100 also includes a signal transmitter/receiver device 108 which is coupled to bus 110 for providing a communication link between the personal digital assistant 100 and a network environment (e.g., network environments 50 and 51 of FIGS. 1 and 2, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 5) and provides the functionality to transmit and receive information over a wireless communication interface. It should be further appreciated that the present embodiment of signal transmitter/receiver device 108 is well-suited to be implemented in a wide variety of ways. For example, signal transmitter/receiver device 108 could be implemented as a modem.

In one embodiment, the personal digital assistant 100 includes a communication circuit 109 coupled to bus 110. Communication circuit 109 includes an optional digital signal processor (DSP) 120 for processing data to be transmitted or data that are received via signal transmitter/receiver device 108. Alternatively, some or all of the functions performed by DSP 120 can be performed by processor 101.

Also included in the personal digital assistant 100 of FIG. 6 is an optional alphanumeric input device 106 which in one implementation is a handwriting recognition pad 106 ("digitizer") having regions 106a and 106b (FIG. 3), for instance.

Alphanumeric input device 106 can communicate information and command selections to processor 101. The personal digital assistant 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with the personal digital assistant 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Moreover, the personal digital assistant 100 includes a user verification device 117 which captures biometric data from a user. As will be fully described below, a user desiring to use or access the personal digital assistant 100 initially interacts (e.g., presses, swipes, touches, etc.) upon the user verification device 117. This initial interaction (or single action by the user) causes the user verification device 117 to capture the biometric data from the user. The personal digital assistant 100 verifies the biometric data. If the verification is successful, the personal digital assistant 100 powers-up from an inactive mode to a normal operation mode and enables the user to use the personal digital assistant 100. Upon powering-up, the personal digital assistant 100 can automatically launch an application program (e.g., a calendar program, an address-book program, a to-do-list program, a memo program, etc.).

Figure 7:
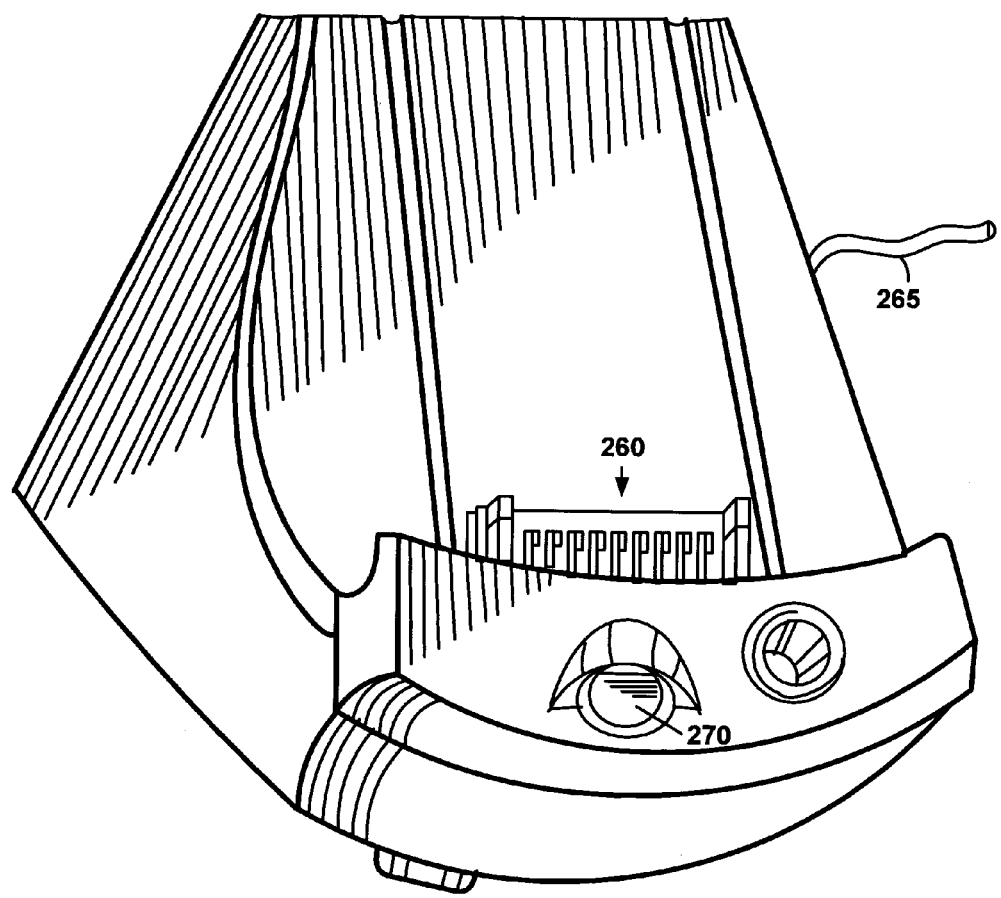
FIG. 7 illustrates a perspective view of a cradle device for connecting the personal digital assistant to other systems via a communication interface.

FIG. 7 is a perspective illustration of one embodiment of the cradle 60 for receiving the personal digital assistant or palmtop computer system 100. Cradle 60 includes a mechanical and electrical interface 260 for interfacing with communication interface 108 (FIG. 4) of the personal digital assistant 100 when the personal digital assistant 100 is slid into the cradle 60 in an upright position. Once inserted, button 270 can be pressed to initiate two-way communication between the personal digital assistant 100 and other computer systems or electronic devices coupled to serial communication 265.

Although the description of the present invention will focus on a personal digital assistant or handheld computer system, the present invention can be practiced with other types of computer systems.

Figure 8:
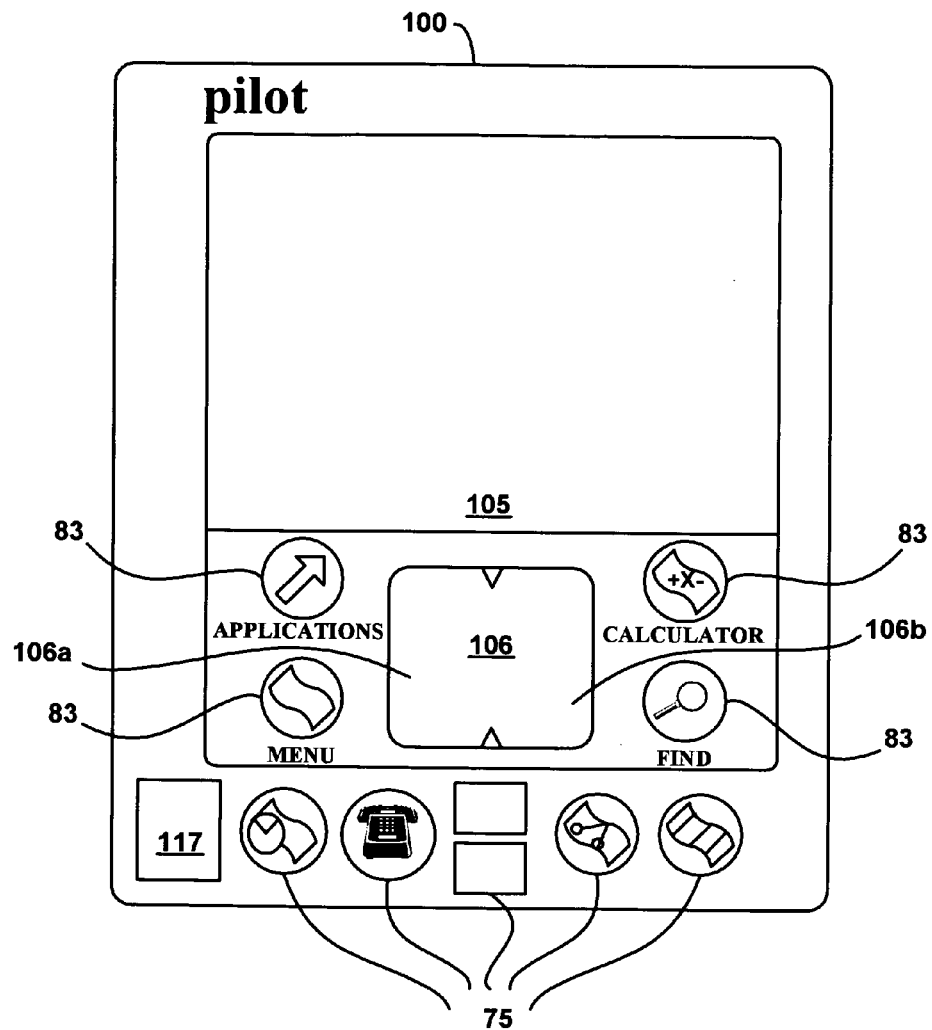
FIG. 8 illustrates a personal digital assistant in accordance with an embodiment of the present invention, whereas the personal digital assistant is in an inactive mode.

FIG. 8 illustrates a personal digital assistant 100 in accordance with an embodiment of the present invention, whereas the personal digital assistant 100 is in an inactive mode. In the inactive mode, the personal digital assistant 100 operates in a low-power state to conserve power while not in use. The personal digital assistant 100 (1) authenticates a user desiring to use or access the personal digital assistant 100 and (2) powers-up from the inactive mode to a normal operation mode in response to a single action by the user. Unlike the security procedure of the prior art, the security procedure of the present invention integrates a security routine and a power-up routine to avoid interfering with the primary function of the personal digital assistant 100: providing quick access to frequently used data. Rather than requiring the user to interact several times with the personal digital assistant 100 before gaining access to the personal digital assistant 100, the present invention authenticates and provides access to an authorized user in response to a single action upon the personal digital assistant 100 by a user desiring to use the personal digital assistant 100. If the user desiring to use the personal digital assistant 100 is not an authorized user, the personal digital assistant 100 denies access.

As illustrates in FIG. 8, the personal digital assistant 100 includes a display screen 105, a handwriting recognition pad 106 or "digitizer" containing two regions 106a and 106b, a plurality of buttons 75 (e.g., to invoke telephone/address data, calendar data, to-do-list data, memo pad data, etc.), a plurality of application buttons 83 individually selectable with a stylus or finger, and a memory device 104 (FIG. 6) for storing a reference template representing stored biometric data from an authorized user, whereas these features were described above. It should be understood that the personal digital assistant 100 can be configured with other features.

Moreover, the personal digital assistant 100 includes a user verification device 117 which interacts with the user and facilitates authentication of the user. In an embodiment, the user verification device 117 includes a biometric sensor which scans and captures biometric data from the user. The biometric data can be of any type. Examples of the biometric data include a thumbprint, a fingerprint, a magnetic characteristic, a color characteristic, a temperature characteristic, a geometric characteristic, and a combination thereof of the user. The user verification device 117 is configured to capture biometric data in response to an action by the user desiring access to the computer system. For example, the user can activate the user verification device 117 by pressing, swiping, touching, or interacting with the user verification device 117 in any other manner. The user verification device 117 can have a button-shape for receiving the finger, thumb, or any other part of the user.

The captured biometric data can be compressed, processed, and verified (e.g., compared with the reference template representing stored biometric data from an authorized user) by the user verification device 117, the processor 101 (FIG. 6) of the personal digital assistant 100, any combination thereof, or in any other manner. Typically, a security procedure that uses biometric data is more secure than a security procedure that relies on a personal identification number (PIN), a password, or the user stroking particular characters on the handwriting recognition pad 106 with a stylus. Moreover, the particular type of biometric data captured by the user verification device 117 affects the identification power of the security procedure of the present invention. In particular, each type of biometric data has an false rejection rate (i.e., rate that an authorized user is denied access) and a false acceptance rate (i.e., rate that an unauthorized user is granted access). The type of biometric data selected for use in the user verification device 117 can be tailored for the particular needs of the authorized user of the personal digital assistant 100.

Figure 9:
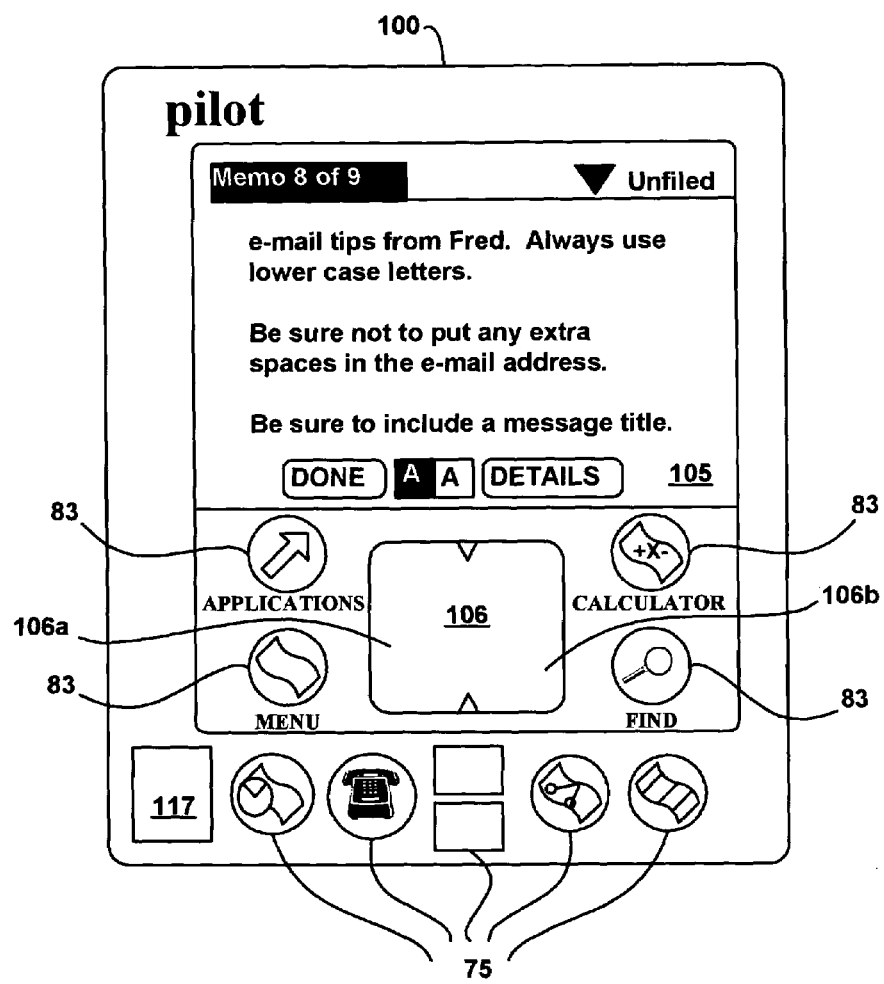
FIG. 9 illustrates a personal digital assistant in accordance with an embodiment of the present invention, whereas the personal digital assistant is in a normal operation mode.

In practice, a user desiring to access the personal digital assistant 100 initially presses, swipes, touches, or interacts in any other manner with the user verification device 117. In response to this single action by the user, the user verification device 117 scans and captures the biometric data from the user. Furthermore, the personal digital assistant 100 verifies the captured biometric data. If the verification is successful, the personal digital assistant 100 powers-up from the inactive mode to a normal operation mode as illustrated in FIG. 9 and enables the user to use the personal digital assistant 100. Thus, the security procedure of the present invention is a seamless and transparent operation from the user's perspective. Moreover, the security procedure of the present invention is convenient and protects the data stored in the personal digital assistant 100 in a manner that improves the user's experience with the personal digital assistant 100 since authentication and power-up are performed in response to a single action by the user.

FIG. 9 illustrates a personal digital assistant 100 in accordance with an embodiment of the present invention, whereas the personal digital assistant 100 is in a normal operation mode. As described above, in response to the single action by the user, the user verification device 117 scans and captures the biometric data from the user. Furthermore, the personal digital assistant 100 verifies the captured biometric data. If the verification is successful, the personal digital assistant 100 powers-up from the inactive mode (as illustrated in FIG. 8) to a normal operation mode as illustrated in FIG. 9 and enables the user to use the personal digital assistant 100. Upon powering-up, the personal digital assistant 100 can automatically launch or invoke a preselected application program (e.g., a calendar program, an address-book program, a to-do-list program, a memo program, etc.) stored in the memory device 104 (FIG. 6) of the personal digital assistant 100. In FIG. 9, a memo program was automatically launched. The user can preconfigure the personal digital assistant 100 to launch any application program. Alternatively, the personal digital assistant 100 can have a plurality of user verification devices 117, each configured to cause the personal digital assistant 100 to launch an associated application program upon powering-up.

Figure 10:
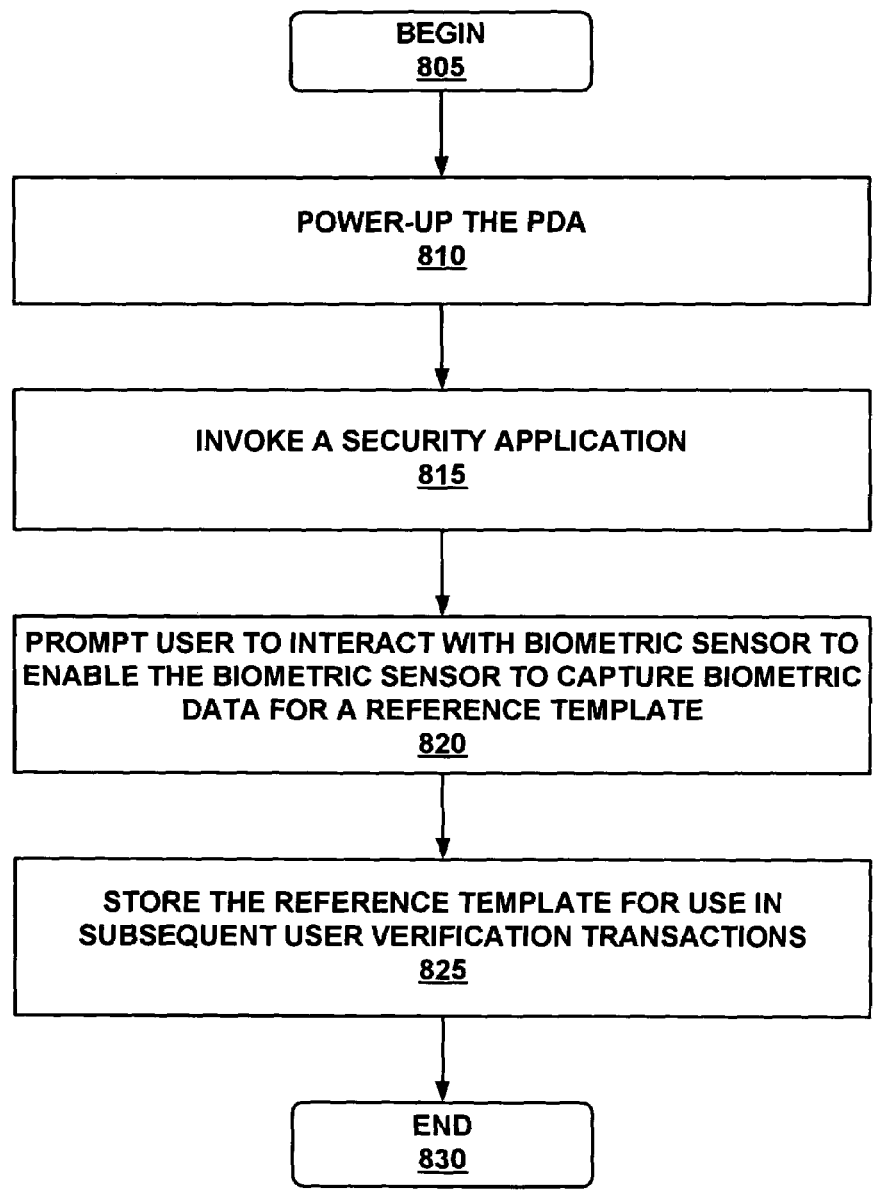
FIG. 10 illustrates a flow chart diagram showing a method of configuring a personal digital assistant to recognize a user in accordance with an embodiment of the present invention.

FIG. 10 illustrates a flow chart diagram showing a method 800 of configuring a personal digital assistant 100 to recognize a user in accordance with an embodiment of the present invention. Reference will be made to FIGS. 6, 8, and 9.

At step 805, the method 800 in accordance with an embodiment of the present invention begins. The personal digital assistant 100 has the security capability described above. However, the user verification device 117 has not scanned and captured a reference template representing the biometric data of an authorized user, whereas the reference template is stored in the memory device 104 or in any other location.

At step 810, the authorized user powers-up the personal digital assistant 100 by pressing, swiping, touching, or interacting in any other manner with the user verification device 117 or any other component of the personal digital assistant 100.

Furthermore at step 815, the personal digital assistant 100 invokes a security application. The security application configures the personal digital assistant 100 to recognize the authorized user.

Continuing with step 820, the user is prompted to interact with the biometric sensor 117 of the user verification device 117. The biometric sensor 117 scans and captures biometric data from the authorized user for generating a reference template which will be used during the security procedure of the present invention. As described above, the biometric data can be of any type. Moreover, the biometric data can be captured from the authorized user's finger, thumb, hand, or any other body part.

At step 825, the reference template is stored in the memory device 104 or in any other location. During subsequent user verification transactions pursuant to the security procedure of the present invention, the reference template is used to verify the identity of a user desiring to use or access the personal digital assistant 100. At step 830, the method 800 in accordance with an embodiment of the present invention ends.

Figure 11:
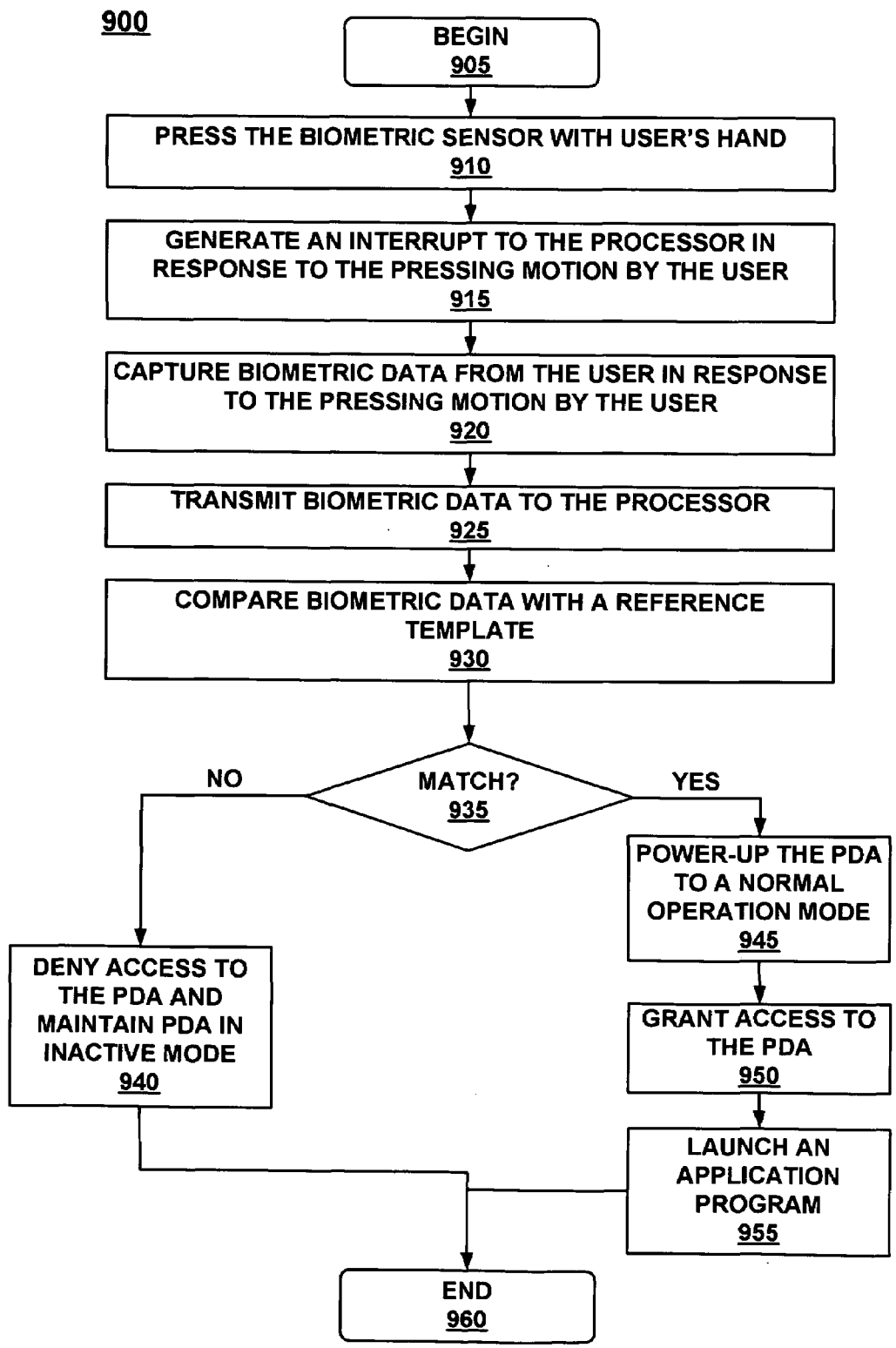
FIG. 11 illustrates a flow chart diagram showing a method of authenticating a user and activating a personal digital assistant in response to a single action by the user in accordance with an embodiment of the present invention.

FIG. 11 illustrates a flow chart diagram showing a method 900 of authenticating a user and activating a personal digital assistant 100 in response to a single action by the user in accordance with an embodiment of the present invention. Reference will be made to FIGS. 6, 8, and 9.

At step 905, the method 900 in accordance with an embodiment of the present invention begins. The personal digital assistant 100 has the security capability described above. Previously, the user verification device 117 has scanned and captured a reference template representing the biometric data of an authorized user, whereas the reference template is stored in the memory device 104 or in any other location. Moreover, the personal digital assistant 100 is in an inactive mode.

Continuing at step 910, a user desiring to access or use the personal digital assistant 100 presses the biometric sensor 117 of the user verification device 117 with his/her finger, thumb, hand, or any other part. Alternately, the user can touch, swipe, or interact with the biometric sensor 117 in any other manner.

At step 915, in response to the single action by the user, an interrupt to the processor 101 of the personal digital assistant 100 is generated by the user verification device 117. The interrupt alerts the processor 101 that a user desires to access the personal digital assistant 100. The personal digital assistant 100 includes interrupt handling code to respond to the interrupt received from the user verification device 117. In an embodiment, the interrupt handling code directs the personal digital assistant 100 to execute the security procedure of the present invention, including verifying the identity of the user. Moreover, the personal digital assistant 100 is sufficiently powered to execute the security procedure.

Continuing at step 920, in response to the single action by the user, the user verification device 117 scans and captures biometric data from the user. In an embodiment, steps 915 and 920 are performed simultaneously.

At step 925, the user verification device 117 transmits the captured biometric data to the processor 101. Alternatively, the user verification device 117 can be configured to verify the identity of the user.

Furthermore, at step 930, the processor 101 compares the captured biometric data with the reference template. At step 935, the processor 101 determines whether the captured biometric data matches the reference template to verify the identity of the user. If there is no match, the method 900 continues to step 940. Here, the personal digital assistant 100 denies the user access to the personal digital assistant 100 and maintains the personal digital assistant 100 in the inactive mode. In an embodiment, the personal digital assistant 100 shuts down for a time period after several consecutive user verification transaction failures.

If there is a match, the method 900 continues to step 945. At step 945, the personal digital assistant 100 is powered-up from the inactive mode to a normal operation mode.

Moreover, at step 950, the personal digital assistant 100 grants the user access to the personal digital assistant 100. At step 955, the personal digital assistant 100 automatically launches a preselected application program.

During the normal operation mode, the user can be prompted to interact again with the user verification device 117 according to a programmable schedule. The user verification device 117 captures new biometric data which is then processed and verified by the processor 101 to continue the user's access to the personal digital assistant 100. The programmable schedule can be configured in any manner. For example, the user may be prompted to reauthenticate every half hour of continuous use in the normal operation mode.

Finally, at step 960, the method 900 in accordance with an embodiment of the present invention ends.

In an embodiment, the user verification device 117 can be configured to capture either a complete set of biometric data or a sample set of biometric data from the user. A security procedure performed with the complete set of biometric data is more reliable and slower than a security procedure performed with a sample set of biometric data. Capturing the complete set of biometric data from the user is appropriate when a user initially requests access to the personal digital assistant 100. Moreover, capturing the sample set of biometric data from the user is appropriate when reauthenticating the user during the normal operation mode. In an embodiment, the personal digital assistant 100 can be provided with criteria for determining when to capture a complete set of biometric data from a user rather than a sample set of biometric data from the user.

Those skilled in the art will recognize that portions of the present invention may be incorporated as computer instructions stored as computer program code on a computer-readable medium such as a magnetic disk, CD-ROM, and other media common in the art or that may yet be developed.

Finally, aspects of the present invention can be implemented as an application, namely, a set of instructions (e.g., program code) which may, for example, be resident in the random access memory of a computer system. Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. In addition, although the various methods of the present invention described above can be conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of enabling a user to access a computer system and activating said computer system, comprising the steps of:

a) capturing biometric data from said user desiring access to said computer system having a user verification device in response to initial interaction by said user with said user verification device;

b) verifying identity of said user using said biometric data; and c) if verification in said step b) is successful, powering-up said computer system to a normal operation mode and granting said user access to said computer system.

2. A method as recited in claim 1 wherein said step a) comprises: generating an interrupt to alert said computer system that said user desires access to said computer system.

3. A method as recited in claim 1 wherein said step b) comprises: comparing said biometric data with a reference template representing stored biometric data of an authorized user.

4. A method as recited in claim 1 further comprising the step of:
automatically invoking an application program upon entering said normal operation mode.

5. A method as recited in claim 1 further comprising the steps of:
capturing new biometric data from said user using said user verification device during said normal operation mode according to a programmable schedule; and
verifying identity of said user using said new biometric data to continue access by said user.

6. A method as recited in claim 1 wherein said biometric data is one of a thumbprint, a fingerprint, a magnetic characteristic, a color characteristic, a temperature characteristic, a geometric characteristic, and a combination thereof of said user.

7. A method as recited in claim 1 wherein said user verification device comprises a biometric sensor.

8. A method as recited in claim 1 wherein said user initiates said step a) by pressing said user verification device.

9. A method as recited in claim 1 wherein said user initiates said step a) by swiping said user verification device.

10. A method as recited in claim 1 wherein said user initiates said step a) by touching said user verification device.

11. A method as recited in claim 1 wherein said user verification device has a button-shape.

12. A computer system comprising:
a user verification device for capturing biometric data from a user, wherein said user initially interacts with said user verification device to gain access to said computer system;
a memory device for storing a reference template representing stored biometric data from an authorized user; and
a processor coupled to said user verification device and to said memory device, said processor operative to receive said biometric data and to compare said biometric data with said reference template, wherein if a match is determined, said computer system is powered-up from an inactive mode to a normal operation mode and said user is granted access to said computer system.

13. A computer system as recited in claim 12 wherein an application program stored in said memory device is automatically invoked upon entering said normal operation mode.

14. A computer system as recited in claim 12 wherein said user is prompted to interact with said user verification device during said normal operation mode according to a programmable schedule so that new biometric data can be captured by said user verification device and processed by said processor to continue access by said user.

15. A computer system as recited in claim 12 wherein said biometric data is one of a thumbprint, a fingerprint, a magnetic characteristic, a color characteristic, a temperature characteristic, a geometric characteristic, and a combination thereof of said user.

16. A computer system as recited in claim 12 wherein said user verification device comprises a biometric sensor.

17. A computer system as recited in claim 12 wherein said user interacts with said user verification device by pressing said user verification device.

18. A computer system as recited in claim 12 wherein said user interacts with said user verification device by swiping said user verification device.

19. A computer system as recited in claim 12 wherein said user interacts with said user verification device by touching said user verification device.

20. A computer system as recited in claim 12 wherein said user verification device has a button-shape.

21. A computer system as recited in claim 12 wherein said computer system comprises a personal digital assistant.

* * * * *